Sept. 17, 1940.   C. J. Z. FANBERG   2,215,096
ROTARY INTERNAL COMBUSTION MOTOR
Filed Sept. 2, 1937
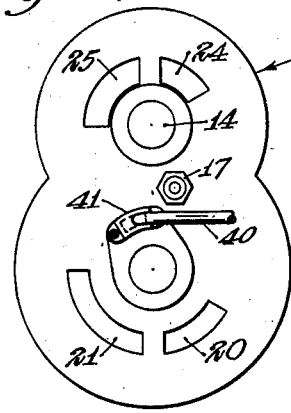
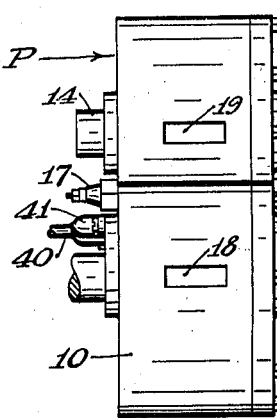
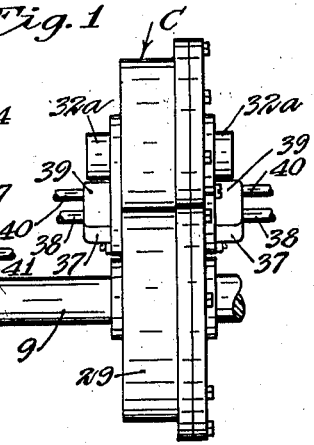
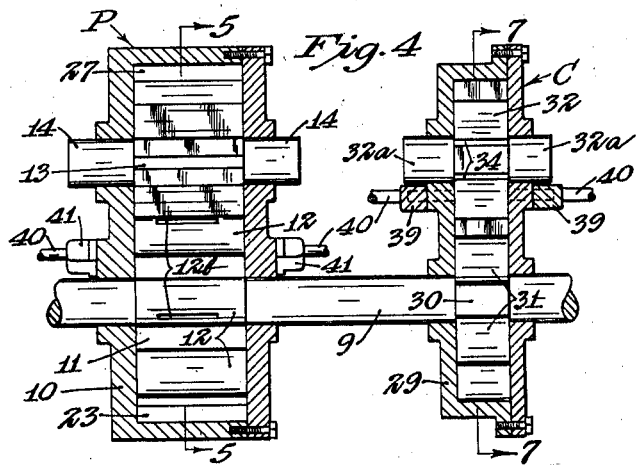
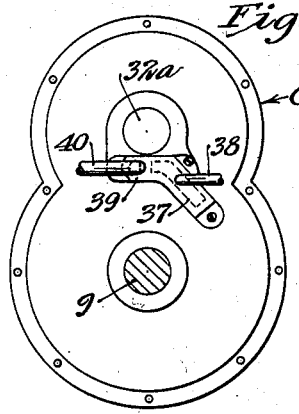
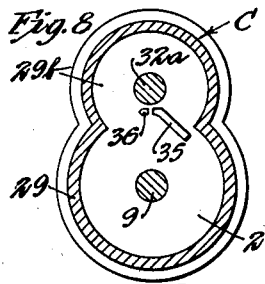
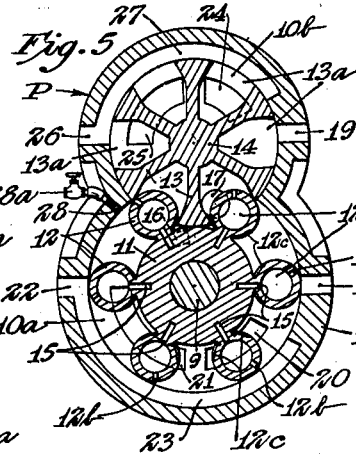
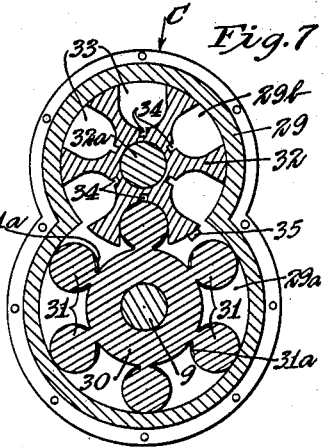
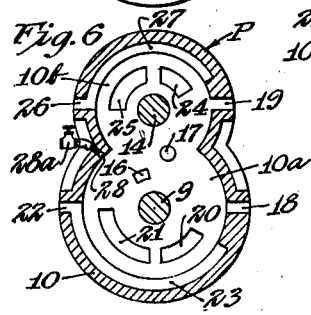
Inventor
Clemons J. Z. Fanberg
By Williamson & Williamson
Attorneys Patented Sept. 17, 1940

2,215,096

UNITED STATES PATENT OFFICE 2,215,096

ROTARY INTERNAL COMBUSTION MOTOR

Clemons J. Z. Fanberg, Kerkhoven, Minn.

Application September 2, 1937, Serial No. 162,157

7 Claims. (Cl. 123—13)

My invention relates to internal combustion motors and particularly to such motors of a rotary type.

The types of internal combustion motors in common use are of the type including cylinders, reciprocating pistons, connecting rods and a crankshaft. As is well known, the use of reciprocating parts is conducive to vibration, power loss and rapid deterioration. Also, such engines include power absorbing valve gear wherein valves are opened against the force of springs by power delivered thereto through a camshaft. Many attempts have been made to produce a satisfactory rotary internal combustion motor, but, in most cases, success has not been attained due to impractical features of design, undue complication, or other factors.

An object of my invention is to provide a practical form of rotary internal combustion motor wherein valve operating mechanism is unnecessary.

Another object is to provide such a motor wherein the intake and compression events are effected in one portion thereof and the power and exhaust events are effected in another section.

Still another object is to provide such a motor having intercommunicating primary and main combustion chambers and wherein combustion is initiated in the primary combustion chambers.

Yet another object is to provide such a motor wherein each combustion chamber has a power event effected therein once in every revolution of the motor.

A further object is to provide such a motor having incorporated in its structure simple and effective means for scavenging burned gases and cooling the motor.

A still further object is to provide such a motor of efficient, smooth running, simple, rugged, reliable and inexpensive construction.

These and other objects and advantages of the invention will more fully appear from the following description made in connection with the accompanying drawing, wherein like reference characters refer to the same or similar parts throughout the views, and in which:

Fig. 1 is a side view of an embodiment of my invention;

Fig. 2 is an end view taken from a point to the left (as viewed in Fig. 1) of my motor and showing the power-producing portion thereof;

Fig. 3 is an end view taken from a point to the right (as viewed in Fig. 1) of my motor and showing the compressor portion thereof;

Fig. 4 is a longitudinal sectional view of the engine;

Fig. 5 is a cross-sectional view taken along the line 5—5 of Fig. 4 as indicated by the arrows;

Fig. 6 is a view similar to Fig. 5 except for being to reduced scale and appearing as with the rotatable parts removed;

Fig. 7 is a cross-sectional view taken along the line 7—7 of Fig. 4 as indicated by the arrows; and Fig. 8 is a view similar to Fig. 7 except for being to reduced scale and appearing as with the rotatable parts removed.

Referring to the drawing, my rotary internal combustion motor consists of a compressor section C in which intake and compression events are effected and a power producing section P, wherein the explosion and exhaust events are effected. A shaft 9 is common to the sections C and P.

The power producing section P includes a casing 10 of figure 8 shape having therewithin a pair of inter-lapping generally cylindrical cavities or chambers 10a and 10b of which the lower chamber 10a may be the larger of the two chambers. The shaft 9 extends through the lower chamber 10a in concentric relation therewith. A cylindrical rotor 11 mounted on the shaft 9 and disposed within the lower chamber 10a is of substantially less diameter than the chamber 10a and extends axially from one side wall to the other of the casing 10. A series of cylindrical elements 12 is formed on the periphery of the rotor 11 in spaced circumferential arrangement with the axes of the respective cylindrical elements 12 disposed parallel to the axis of the rotor 11. Another rotor 13 is concentrically disposed within the upper chamber 10b and is carried on a shaft 14 journalled in the walls of the casing 10. The rotor 13 is provided with recesses or pockets 13a for relatively snugly receiving the cylindrical elements carried by the rotor 11 so that the rotors 11 and 13 are intermeshed for rotation in unison. As viewed in Fig. 5, the rotor 11 rotates in a clockwise direction and the rotor 13 in a counter-clockwise direction.

The recesses or pockets 13a and cylindrical elements 12 received therein define combustion chambers. Means is provided for delivering a precompressed charge of explosive mixture into the combustion chambers thus provided. Each of the cyindrical elements 12 carried by the rotor 11 is of hollow construction to provide a chamber 12a therewithin, this chamber, as will be described, constituting a primary combustion chamber. Each of the chambers 12a has a relatively small port 12b for communication with a corresponding main combustion chamber 13a constituted by one of the pockets or recesses 13a. An axially extending groove 15 is formed partially in the cylindrical element 12 and partially within the main portion of the rotor 11. The grooves 15 open into their respective primary combustion chambers 12a and also open at the ends of the rotor 11. The casing 10 is provided with inlet ports 16 adapted for registration with the ends of the respective grooves 15 so as to communicate with the primary combustion chambers 12a. The inlet ports 16 are in the end walls of the casing 10 at such a distance from the axis of the shaft 9 as to be covered by the main portion of the rotor 11.

For purposes of properly timing the registration of a particular groove 15 with the inlet port 16, the port 16 is disposed somewhat to the left of a plane common to the axes of the shafts 9 and 14, as shown in Figs. 5 and 6. For ignition of charges of explosive mixture, a spark plug 17 is situated in each end wall of the casing 10 in such position as to register with the primary combustion chamber 12a of a cylindrical element 12 at such time as said cylindrical element has rotated slightly past said common plane. Exhaust ports 18 and 19 extend radially outwardly through the peripheral walls of the lower and upper portions of the casing 10 in positions generally horizontally aligned with the axes of the respective shafts 9 and 14.

For scavenging of burned gases and cooling of the motor air inlet and outlet ports are provided. Air inlet ports 20 and 21 are provided in the lower halves of the end walls of the lower portion of the casing 10 just outwardly of the main portion of the rotor 11. These air inlet ports are of relatively narrow elongated arcuate shape. An air outlet port 22 is provided in the left-hand (as viewed in Fig. 5) portion of a lower half of the casing 10 at substantially the level of the axis of the shaft 9. A groove 23 is formed in the interior periphery of the lower half of the lower portion of the casing 10, extending from a point somewhat below the exhaust port 18 to the air outlet 22. In a similar manner the upper portion of the casing 10 is provided with air inlets 24 and 25, an air outlet 26, and an air conducting groove 27.

An air relief port 28 is provided in the upper left-hand part of the lower portion of the casing 10. A valve 28a is provided for the port 28 whereby exit of air therethrough may be blocked or adjustively limited as desired. With the valve 28a closed or nearly closed and the rotor 11 rotating clockwise, at least part of the air contained in the space between two cylindrical bodies 12 disposed above the outlet port 22 will be compressed into one of the pockets 13a of the upper rotor 14, the quantity of air compressed and accordingly the compression pressure obtained being dependent upon the setting of the valve 28a.

For operation of the motor a suitable source of compressed explosive mixture is connected to the inlet ports 16. This source is the compressor section C which will be described later. The spark-plugs 17 are, of course, connected to a suitable ignition system which may be of conventional form. In operation of the motor, a precompressed charge of explosive mixture will be delivered from the ports 16 into a primary combustion chamber 12a of one of the cylindrical elements 12 through the corresponding groove 15 when that cylindrical element 12 has reached such a position that the groove 15 associated therewith comes into registration with the inlet port 16. At such time the port 12b of the cylindrical element 12 has entered one of the pockets or recesses 13a of the rotor 13. Further clockwise rotation of the shaft 9 will result in the cylindrical element being received deeper into the recess 13a with which it is associated. When the primary combustion chamber 12a of the cylindrical element 12 reaches a position registering with the spark plugs 17, the spark plugs are operated to ignite the compressed charge contained within the primary explosion chamber 12a. The valve 28a may be maintained open during the process of starting my motor so as to enable a reduced compression pressure in the pockets 13a and thus render the motor easily rotatable for the purpose of starting the same. After the motor has been started, the valve 28a may be closed whereupon the degree of compression in the pockets 13a will become sufficient to cause ignition of the charge therein at or near dead center by compression, and whereafter operation of the spark-plugs may be dispensed with or, if desired, may be continued. A small amount of burning gas will remain pocketed in the spark-plugs 17 to assist in igniting the charge in the next chamber 12a reaching the spark-plugs 17. The valve 28a may, of course, be left slightly open, rather than tightly closed, and may be adjustively positioned to adjust the degree of compression so as to selectively determine the timing of the compression ignition and secure the best operation of the motor under various conditions of load and speed. As the compressed charge burns, it will expand outwardly through the port 12b to ignite the compressed charge which has been delivered to the interior of the recess 12a through the port 12b. When the combustion or explosion of the compressed charge of explosive mixture occurs, the pressure produced thereby will tend to expel the cylindrical element 12 from the recess 13a with which it is associated, and hence will tend to rotate the rotor 11 in a clockwise direction. Also the expanding charge within the primary combustion chamber 12a, in issuing through the port 12b will be directed against a portion of the upper rotor 13 defining the main combustion chamber 13a, and hence will tend to drive the upper rotor 13 in a counter-clockwise direction. Further rotation of the shaft 9 in a clockwise direction will, of course, be accompanied by movement of the cylindrical element 12, to the right and downwardly ahead of the expanding gases. As the cylindrical element 12 passes the exhaust port 18, the burned gases will proceed to exhaust through the exhaust port 18. Also burned gases from the main combustion chamber 13a will exhaust into the upper exhaust port 19 when the recess 13a is passing the upper exhaust port 19. The cylindrical elements disposed at the lower portion of the rotor 11 and moving in a clockwise direction will function in the manner of the impeller of a centrifugal blower and will suck in air through the air inlet ports 20 and 21 and deliver this air through the groove 23 to the port 22 and through the port 22 to the surrounding atmosphere. This movement of air will scavenge the spaces between successive ones of the cylindrical elements 12 of any remaining traces of burned gas and also will act to cool the cylindrical elements 12, the rotor 11, and the casing 10. The portions of the upper rotor 13 defining the recesses 13a will in a similar manner cooperate with the air inlet ports 24 and 25, the grooves 27, and the air outlet 26 to scavenge and cool the upper rotor and the upper portion of the casing 10.

The compressor section in my motor is for the purpose of delivering precompressed explosive mixture to the inlet ports 16 of the power producing section P of the motor. The compressor section includes a casing 29 of figure 8 shape having therewithin a pair of interlapping cavities or chambers 29a and 29b of which the chamber 29a is the lowermost one and may be somewhat larger in diameter than the upper chamber 29b. A rotor 30 is contained within the lower chamber 29a and is mounted on the shaft 9 for rotation therewith. The main portion of the rotor 30 is of substantially less diameter than the chamber 29a and carries thereupon cylindrical elements 31 which are disposed in spaced relation to each other in a series encircling the main portion of the rotor 30. The respective axes of the cylindrical elements 31 are parallel to the common axis of the shaft 9 and rotor 30. A rotor 32 is disposed in the upper chamber 29b and has in its peripheral portion a circumferentially extending series of recesses or pockets 33 for receiving the cylindrical elements 31 of the lower rotor 30 so that the rotors 30 and 32 are intermeshed for rotation in unison. The rotor 32 is mounted on a horizontal shaft 32a which is journalled in suitable apertures in the end walls of the casing 29. The recesses 33 and cylindrical elements 31 received therein define compression chambers. At the inner limits of the respective recesses 33, grooves 34 are formed to function as an inlet and outlet duct for the compression chambers described above. Ports are provided in the end walls of the casing 29 for the purpose of admission and exhausting of gases compressed in the above described compression chambers. The inlet ports 35 extend from a point just to the right of a plane common to the axes of the rotors 30 and 32 and positioned for registration therewith of the grooves 34 downwardly and to the right to a point just beyond the periphery of the upper rotor 32. An outlet port 36 is disposed just to the left of the above described common plane in position for registration therewith of the grooves 34.

Each of the inlet ports 35 is connected through a hollow element 37 and a conduit 38 to any suitable source of explosive mixture such as a conventional carburetor. The outlet ports 36 are connected through hollow elements 39 and tubes 40 to hollow elements 41 in communication with the inlet ports 16 of the power producing unit P.

In operation of the compressor unit C, the shaft 9 and the lower rotor 30 rotate in a clockwise direction and the upper rotor 32 rotates in a counter-clockwise direction. As a cylindrical element 31 is withdrawn from the corresponding one of the recesses 33 due to such rotation, the recess 33 comes into registration with the inlet port 35 and hence sucks in a charge of explosive mixture. Also since a portion of the upper rotor 32 is withdrawn from a space between adjoining cylindrical elements 31, a charge of explosive mixture is sucked into such space. The charges thus sucked into the recess 33 and the space between the adjoining cylindrical elements 31 is carried through almost a complete revolution of the compressor rotors, whereupon the particular cylindrical element 31 referred to, again enters the same recess 33 as before, and compresses thereinto the charges of explosive mixture contained in the space between adjoining cylindrical elements 31 and in the recess 33. As the cylindrical element 31 approaches a position wherein it is completely received within the recess 33, the explosive mixture has been compressed into a relatively small space and the associated groove 34 comes into registration with the outlet ports 36 through which the highly compressed charge is delivered through the hollow elements 39, the tubes 40 and the hollow elements 41 into the inlet ports 16.

Each of the cylindrical bodies 12 and 31 is provided with grooves 12c and 31a on the leading and trailing sides thereof, as shown in Figs. 5 and 7, to prevent entrapment of explosive mixture between the outer ends of the vanes 13 and 32 and the respective rotor bodies 11 and 30 and the incidental possibility of compression ignition of mixture so entrapped.

My compression section C is also adapted for use as a fluid pressure operated motor and may be made to so operate by connecting a source of fluid under pressure to the port 36 thereof whereupon the shaft 9 may be rotated in a counter-clockwise direction (as viewed in Fig. 7) responsive to fluid pressure.

It is to be noted that the lower rotors 11 and 30 of the power producing section P and the compressor section C are carried by the common shaft 9 and will, accordingly rotate in unison. The upper rotors of the power producing and compressor sections are, of course, intermeshed with the lower rotors and hence all four rotors will rotate in unison.

It is to be noted that my motor described above requires no timing gears, camshaft or any other valve operating mechanism, and that there are no reciprocating parts of any type.

It is apparent that I have invented a novel, simple, rugged and inexpensive form of rotary engine capable of smooth and efficient operation and including means for effectively scavenging and cooling the internal spaces thereof.

It will, of course, be understood that various changes may be made in the form, details, arrangement and proportions of the various parts without departing from the scope of my invention.

What is claimed is:

1. A rotary internal combustion motor comprising, a casing having a pair of interlapping cylindrical cavities therewithin, two rotors rotatably mounted in the respective cavities each in concentric relation to its respective cavity and each having a main portion of substantially less diameter than the cavity within which it is contained, the annular space between each of said main portions and the limits of the cavity containing the same constituting a chamber, an annular series of spaced, hollow, cylindrical elements formed on one of said main portions with axes parallel to the axis of said main portion and diameters extending radially outwardly of said main portion to the outer limit of the corresponding chamber, vanes extending radially outwardly of the main portion of the second rotor to the outer limits of the corresponding chamber so as to define recesses therebetween for respectively closely receiving successive ones of said cylindrical elements as said rotors are rotated in unison in opposite directions whereby a pocket and a cylindrical element received therein define an explosion chamber, each of said hollow elements having a port therein positioned for opening into a corresponding one of such explosion chambers as the same is formed, means for delivering explosive mixture to said hollow elements, ignition means associated with said explosion chambers, and means for exhausting burned charges of explosive mixture.

2. The structure defined in claim 1 and said casing being provided, in portions thereof adjoining portions of said first rotor relatively remote from said recessed rotor, having air ports at respectively different distances from the rotational axis of said first rotor whereby said cylindrical elements may function as impeller vanes to cause influx of air through an inwardly disposed one of said air ports and exit of air through an outwardly disposed one of said air ports to effect scavenging of burned gases from the cavity containing said first rotor.

3. The structure defined in claim 1, portions of said second rotor defining said recesses constituting vanes, and said casing being provided, in portions thereof adjoining portions of said second rotor relatively remote from said first rotor, having air ports at respectively different distances from the rotational axis of said second rotor whereby said vanes may function as impeller vanes to cause influx of air through an inwardly disposed one of said air ports and exit of air through an outwardly disposed one of said air ports to effect scavenging of burned gases from the cavity containing said second rotor.

4. A rotary internal combustion motor comprising, a casing having a pair of interlapping cylindrical cavities therewithin, two rotors rotatably mounted in the respective cavities in concentric relation thereto, one of said rotors having a diameter substantially less than that of the cavity containing the same, an annular series of circumferentially spaced, hollow, cylindrical elements formed on the periphery of said rotor with axes parallel to the axis thereof and diameters extending radially from said periphery to the outer limit of the corresponding cavity, the second of said rotors having recesses therein for receiving said cylindrical elements in substantially sealed relation thereto whereby said rotors are intermeshed to rotate in unison in respectively opposite directions, each of said recesses, when one of said cylindrical elements is contained therein, defining in conjunction with said cylindrical element a main explosion chamber and the interior space of said cylindrical element constituting a primary explosion chamber, each of said cylindrical elements having a port therein communicating between said primary and main explosion chambers, means for delivering an explosive mixture into said primary explosion chamber and through said port into said main explosion chamber, means for igniting explosive mixture in said primary explosion chamber, and means for exhausting a burned charge from said primary and main explosion chambers.

5. A rotary internal combustion motor comprising a pair of casings each having a pair of interlapping cylindrical chambers therewithin, a rotor in each of said chambers, a common shaft carrying one rotor in one casing and the corresponding rotor in the second casing, a circumferentially extending series of spaced cylindrical elements formed on the periphery of each of the rotors on said shaft with axes parallel to said shaft, the second rotor in each of said casings having a series of recesses in its peripheral portion for successively receiving successive ones of the cylindrical elements of the first rotor associated therewith whereby all of said rotors are rotatively connected together for rotation in unison, each of the recesses of the second rotor in the first casing and a cylindrical element received therein constituting a compression chamber and each of the recesses of the second rotor in the second casing and a cylindrical element received therein constituting a combustion chamber, means for admitting uncompressed explosive mixture to the compression chambers in said first casing, means for conducting compressed explosive mixture from said compression chambers to the combustion chambers in said second casing, means for igniting explosive mixture in said combustion chambers, and means for exhausting burned explosive mixture from said combustion chambers.

6. A rotary internal combustion motor comprising, a casing having a pair of interlapping cylindrical cavities therewithin, two rotors rotatably mounted in the respective cavities in concentric relation thereto and each having a main portion of substantially less diameter than the cavity within which it is contained, the annular space between each of said main portions and the limits of the cavity containing the same constituting a chamber, an annular series of spaced, hollow, cylindrical elements formed on one of said main portions with axes parallel to the axis of said main portion and diameters extending radially outwardly of said main portion to the outer limit of the corresponding chamber, vanes extending radially outwardly of the main portion of the second rotor to the outer limit of the corresponding chamber so as to define recesses therebetween for respectively closely receiving successive ones of said cylindrical elements as said rotors are rotated in unison in opposite directions whereby a pocket and a cylindrical element received therein define a compression and explosion chamber, said first chamber having an inlet port therein for admitting a gas thereinto to occupy spaces between successive ones of said cylindrical elements as the same move toward said recesses, said casing having a port therein just ahead of the point where said cylindrical elements are received in said recesses adapted for releasing a portion of said gas to limit the amounts thereof compressed into said recesses by said cylindrical elements, ignition means for igniting compressed charges in said recesses, and means for exhausting burned charges.

7. The structure defined in claim 6 and a regulating valve associated with said gas release port for adjustive regulation of the flow of gas therethrough.

CLEMONS J. Z. FANBERG.